United States Patent [19]

Dubowik

[11] Patent Number: 4,822,443

[45] Date of Patent: Apr. 18, 1989

[54] APPARATUS FOR ATTACHING TOUCH FASTENERS WITH SELF-HEATING ATTACHMENT ADHESIVE

[75] Inventor: John M. Dubowik, Nashua, N.H.

[73] Assignee: Velcro Industries B.V., Amsterdam, Netherlands

[21] Appl. No.: 939,364

[22] Filed: Dec. 8, 1986

[51] Int. Cl.$^4$ .............................................. B32B 21/04
[52] U.S. Cl. .............................. 156/379.7; 156/379.8; 156/580.2
[58] Field of Search ............... 156/379.6, 379.7, 379.8, 156/380.6, 580.1, 580.2, 583.91

[56] References Cited

U.S. PATENT DOCUMENTS

| | | | |
|---|---|---|---|
| 3,756,889 | 9/1973 | Wolfberg et al. | 156/379.8 |
| 3,888,715 | 6/1975 | Fraser et al. | 156/379.7 |
| 4,096,016 | 6/1978 | Pohl | 156/379.8 |
| 4,169,007 | 9/1979 | Pray | 156/379.8 |
| 4,411,721 | 10/1983 | Wishart | 156/580.2 |
| 4,455,191 | 6/1984 | Tatum, Sr. | 156/580.2 |
| 4,498,941 | 2/1985 | Goldsworthy | 156/379.6 |

*Primary Examiner*—Richard V. Fisher
*Assistant Examiner*—Wanda L. Millard

*Attorney, Agent, or Firm*—Hayes, Soloway, Hennessey & Hage

[57] ABSTRACT

Apparatus for attaching touch fastener material capable of self-bonding to a porous surface such as fabric and the like by the application of an electrical current therethrough. The material comprises a backing material with front and rear surfaces and having one portion of a touch fastening system on the front surface thereof. A layer of thermoplastic and thermosetting adhesive is bonded to the rear surface. Heat generating means are incorporated into the layer of adhesive for producing sufficient heat in the adhesive when a low voltage and high current electrical source is applied therethrough to cause the adhesive to adhere to a porous surface with which it is in contact. In one embodiment, the heat generating means comprises a strip of metal foil embedded within the layer of adhesive. In a second embodiment, the heat generating means comprising a plurality of electrically conductive/resistive particles embedded within the layer of adhesive. The apparatus includes embodiments having a roller and band moving in combination, a pair of opposed rollers, and mirror imaged feet moving in the manner of a sewing machine drive foot. Each embodiment includes contact pins for contacting the adhesive passing low voltage high current electricity therethrough.

19 Claims, 6 Drawing Sheets

APPARATUS FOR ATTACHING TOUCH FASTENERS WITH SELF-HEATING ATTACHMENT ADHESIVE

BACKGROUND OF THE INVENTION

The present invention relates to touch fastener materials and their attachment to surfaces and, more particularly, to apparatus for attaching touch fastener material capable of self-bonding to a surface such as fabric and the like by the application of an electrical current therethrough wherein such apparatus comprises apparatus for attaching touch fastener material having a backing material with front and rear surfaces and having one portion of a touch fastening system on the front surface thereof, a layer of thermoplastic/thermosetting adhesive bonded to the rear surface, and, an electrically conductive/resistive material incorporated into the layer of adhesive capable of producing sufficient heat in the adhesive when a low voltage and high current electrical source is applied therethrough to cause the adhesive to adhere to the surface of an article with which it is in contact, wherein the apparatus comprises support means for supporting the article with the surface thereof exposed and the touch fastener material disposed thereon; compression means for releasably bearing against the front surface of the touch fastener material to hold it and its adhesive against the surface of the article; a plurality of contact means for releasably making electrical contact with the electrically conductive/resistive material in the adhesive when the compression means is bearing against the front surface of the touch fastener material; and, electrical means for applying low electrical current to flow through the electrically conductive/resistive material in the adhesive between respective ones of the contacts to heat the adhesive to its point of melting and adhesion.

Touch fastening systems such as those sold by the assignee of the present application under the trademark VELCRO are well known in the art and are continually being adapted to new uses as their value and ease of use becomes more and more recognized and appreciated. As used herein, the term "touch fastener", and similar designations, refers to a first planar backing material having a surface carrying hooks, mushrooms, balls on stems, pigtails, or the like, capable of engaging loops, hooks, mushrooms, balls on stems, pigtails, or the like carried by a second planar backing material to releasably fasten components together. In this specification "touch fastener" shall also be construed to include zip fasteners and buttons, press studs and the like when attached to a planar backing for mounting to a component. For convenience only, hook and loop type touch fastening material is shown in the drawings.

Where porous materials and surfaces are involved, a popular method of attaching or bonding the touch fastener materials to the components is the use of heat-activated adhesives of a type well known in the art which are thermosetting and thermoplastic in nature. Often, the heat-activated adhesive can be applied by injecting it from a hot extruding "gun" between two surfaces to be joined (or deposited onto one of them) and then pressing the surfaces together while the adhesive is in its thermoplastic state.

There are many applications involving the application of touch fastener materials with adhesive, however, where the use of a so-called "glue gun" is not an approach of choice. For example, such a situation exists where lightweight fabrics are involved, as opposed to applications employing canvas, or the like, where spot fastening with a glue gun is not a problem. Were there an alternative manner of applying the touch fastener materials with the adhesive in such more delicate applications, it would be gratefully accepted and adopted. In my co-pending application titled TOUCH FASTENER WITH SELF-HEATING ATTACHMENT ADHESIVE, filed on even date herewith and assigned to the assignee of this invention, I disclosed touch fastening materials incorporating pre-applied heat-activated thermoplastic/thermosetting adhesives which are self-heating through the application of an electrical current therethrough.

Figure 1:
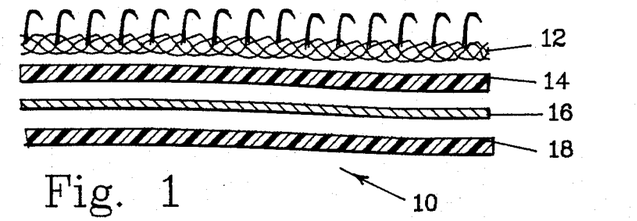
FIG. 1 is an exploded side view showing the components of the hook portion of hook and loop touch fastening material made according to the teachings of my co-pending application in a first embodiment thereof.
Figure 2:
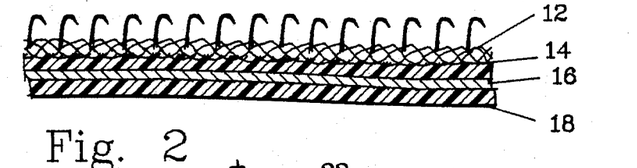
FIG. 2 is a side view of the components of FIG. 1 in their assembled state prior to attachment to a surface.

Touch fastener material according to the above-referenced co-pending application in one embodiment thereof is shown in FIGS. 1-4. The material itself is shown in exploded view in FIG. 1 and generally indicated therein as 10. The material 10 comprises a strip of touch fastener material 12 with a self-heating adhesive on the back surface thereof. For purposes of description only, the touch fastener material 12 is a conventional piece of the hook portion of hook and loop type fastening material comprising a porous backing material having a plurality of engaging hooks on the front surface thereof. The adhesive comprises a first layer 14 of thermoplastic adhesive of a type generally well known in the art and commercially available from any sources. A strip of electrically conductive/resistive metal foil 16, such as aluminum foil, is disposed between the first layer 14 of adhesive and a second layer 18 of the same material. In the form as intended for commercial sale ready for attachment, the components of FIG. 1 are heat bonded together as shown in FIG. 2. The layers 14, 18 of adhesive are bonded to the foil 16 and the first layer 14 of adhesive is bonded to the back surface of the touch fastener material 12.

Figure 3:
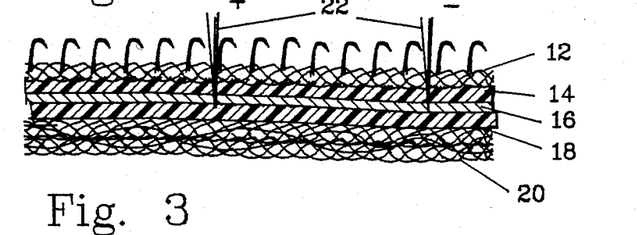
FIG. 3 is a side view of the assembled components of FIG. 2 disposed of a surface to which they are to be bonded with a pair of contact pin electrodes placed for applying an electrical current thereto.
Figure 4:
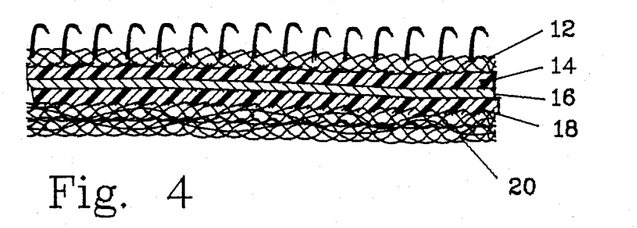
FIG. 4 is a side view showing the components of FIG. 3 as bonded together following the heating of the adhesive layer by the electrical current therethrough.

To attach the touch fastener of the present invention to a strip of fabric 20, for example, it is positioned as shown in FIG. 3 with the second layer 18 of adhesive contacting the fabric 20. A plurality of contact pins 22 are then pushed through the touch fastener material 12 and/or the fabric 20 into contact with the foil 16. Alternative pins 22 are connected to positive (+) and negative (−) low voltage sources having high current capability and the high current is caused to flow through the foil 16 between the pins 22 causing the foil 16 to heat due to its electrical resistance and thereby heat the layers 14, 18 of adhesive to their thermoplastic/thermosetting level. Second layer 18 thereupon bonds to the surface of the fabric 20.

In a second embodiment of the material of the above-referenced co-pending application, the adhesive has electrically conductive/resistive particles mixed therein in place of the metal foil of the previously described embodiment. When the contact pins 22 are stuck into the adhesive, they make electrical contact with the particles. The particles, in turn, resistively conduct the current from one to another causing heat to be generated in the same manner as the foil.

Since the material of the abovereferenced co-pending application did not exist until my invention thereof, there is, accordingly, no device for attaching it on a commercial or high production basis in the same way that a sewing machine can be used for easily and quickly performing sewing operations that would, otherwise, have to be accomplished by hand.

Wherefore, it is the object of the present invention to provide apparatus for attaching the touch fastening materials of my co-pending application which incorporate pre-applied heat-activated thermoplastic/thermosetting adhesives which are self-heating through the application of an electrical current therethrough.

SUMMARY

The foregoing objective has been accomplished by the apparatus of the present invention for attaching touch fastener material having a backing material with front and rear surfaces and having one portion of a touch fastening system on the front surface thereof, a layer of thermoplastic/thermosetting adhesive bonded to the rear surface, and, an electrically conductive/resistive material incorporated into the layer of adhesive capable of producing sufficient heat in the adhesive when a low voltage and high current electrical source is applied therethrough to cause the adhesive to adhere to the surface of an article with which it is in contact, said apparatus comprising support means for supporting the article with the surface thereof exposed and the touch fastener material disposed thereon; compression means for releasably bearing against the front surface of the touch fastener material to hold it and its adhesive against the surface of the article; a plurality of contact means for releasably making electrical contact with the electrically conductive/resistive material in the adhesive when the compression means is bearing against the front surface of the touch fastener material; and, electrical means for applying low voltage electrical current to flow through the electrically conductive/resistive material in the adhesive between respective ones of the contacts to heat the adhesive to its point of melting and adhesion.

In one embodiment, the compression means is a hollow cylindrical roller mounted for rotation about a longitudinal axis; the support means is a moving band disposed close adjacent the surface of the roller at one point and moving in a plane parallel to the longitudinal axis at the one point, the band being positioned and adapted to have the article and touch fastener material disposed thereon and to carry them between the band and the roller at the one point to be compressed therebetween as the roller rolls along the band; the plurality of contact means comprises a plurality of contact pins disposed within the roller; and additionally, a plurality of holes are circumferentially disposed in sidewalls of the roller for having the contact pins pass therethrough. Means are provided within the roller for urging the contact pins through respective ones of the holes to contact the adhesive at the one point and for retracting the contact pins into the roller when not adjacent the one point.

In a second embodiment, the compression means is a first hollow cylindrical roller mounted for rotation about a longitudinal axis; the support means is a second hollow cylindrical roller mounted for driven rotation about a longitudinal axis parallel to the longitudinal axis of the first roller and disposed close adjacent the first roller at one point, the rollers being positioned and adapted to grip and pull the article and touch fastener material therebetween at the one point to be compressed between the rollers; the plurality of contact means comprises a plurality of contact pins disposed within the rollers. As with the previous embodiment, a plurality of holes are circumferally disposed in sidewalls of the rollers for having the contact pins pass therethrough and means are provided within the rollers for urging the contact pins through respective ones of the holes to contact the adhesive at the one point and for retracting the contact pins into the rollers when not adjacent the one point.

In a third embodiment, planar worktable means are provided for supporting the touch fastener material and the article in combination on a top surface thereof, the worktable means having a longitudinal slot therethrough communicating between the top surface and a bottom surface thereof; the compression means is a first foot disposed above the slot; the support means is a second foot disposed below the slot, the feet being mirror images of one another and adapted to move in a driven pattern wherein they start from a first position at one end of the slot at positions opposed and separated from one another, then move towards one another to grip the touch fastener material and article in combination therebetween, then move along the length of the slot, then separate from one another to release the touch fastener material and article from therebetween, and then return to the first position; and additionally, the contact means comprise a plurality of contact pins disposed on facing surfaces of respective ones of the feet.

DESCRIPTION OF THE PREFERRED EMBODIMENT

Figure 5:
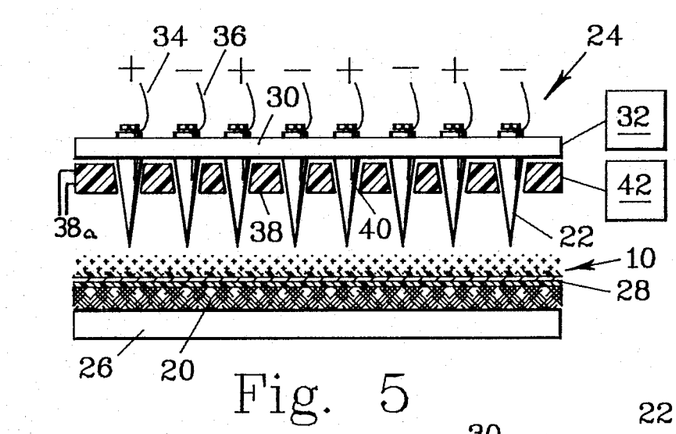
FIG. 5 is a simplified side view of apparatus according to the present invention in a first embodiment prior to the attachment process.

Apparatus according to the present invention in a first and basic embodiment adapted for batch processing is shown in FIGS. 5-8. As shown in FIG. 5, the apparatus, generally indicated as 24, comprises a support plate 26 adapted to have the fabric 20 (or other article to which attachment is to be made) placed on the top surface thereof with the touch fastening material 10 according to my above-referenced co-pending application placed on top of the fabric 20 with its self-heating adhesive layer 28 contacting the top surface of the fabric 20. A movable upper place 30 is positioned above and parallel to the support plate 26. A driver mechanism 32 is operably connected to the upper place 30 to move it between the raised position shown in FIG. 5 and a lowered position to be described shortly with respect to FIG. 6. Such driver mechanisms are well known to those skilled in the art and, therefore, in the interest of simplicity and to avoid redundancy, further description thereof is not included herein. The movable upper plate 30 carries a plurality of contact pins 22 electrically isolated from one another. In the preferred embodiment the pins 22 are in a regular pattern such as a rectangle of rows and columns or a helix so as to be regularly and evenly spaced from one another and thus cause even heating throughout the adhesive layer 28. Alternative pins 22 are connected, respectively, by wires 34 and 36 to positive (+) and negative (−) electrical potentials. For simplicity, the electrical connections have been eliminated from the remaining figures relating to this embodiment.

The pins 22 are preferably heated to maintain adhesive deposited thereon in a molten condition to permit the pins 22 to electrically conductively contact the foil. Here pin heating is achieved by electrical heating elements (not shown) disposed in plate 38 and connected to an electrical power supply 38a (FIG. 5 only).

An ejection/pressure plate 38 is disposed between the upper plate 30 and the support plate 26. The ejection/pressure plate 38 has holes 40 therethrough in alignment with the pins 22 such that the ejection/pressure plate 38 can fit over the pins 22. A driver mechanism 42 similar to driver mechanism 32 is operably connected to move the ejection/pressure plate 38 between a raised position as shown in FIG. 5 wherein it is close adjacent the upper plate 30 and a lowered position to be described shortly with respect to FIG. 8.

Figure 6:
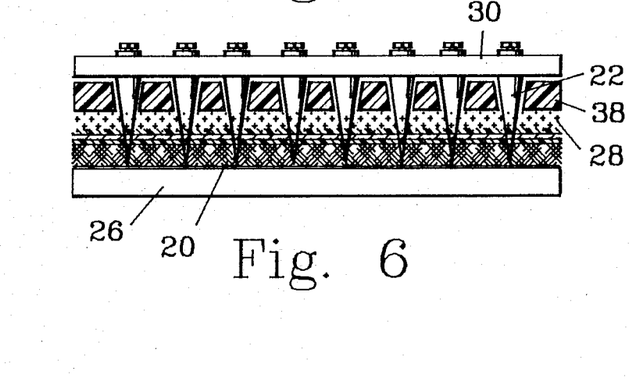
FIG. 6 shows the apparatus of FIG. 5 with the contact pin lowered into position for attachment of the touch fastener material.
Figure 7:
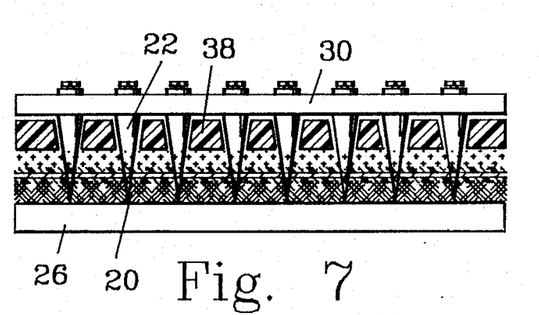
FIG. 7 shows the apparatus of FIG. 6 and the touch fastener material after application of electrical current through the contact pins.

In operation, the upper plate 30 and ejection/pressure plate 38 are lowered in combination by the driver mechanisms 32, 42 to the positions of FIG. 6. This causes the pins 22 to pierce the touch fastener material 10 and electrically contact the self-heating adhesive layer 28. Simultaneously, the ejection/pressure plate 38 applies pressure to the top of the touch fastener material 10 to hold it and the adhesive layer 28 firmly against the top of the fabric 20. The electrical potential can be applied constantly to the pins 22 or selectively applied, as desired, since there is no conductivity path between the pins 22 when they are not in electrical contact with the adhesive layer 28. If it is desired or required to allow cooling of the adhesive under pressure, the electrical path to the pins 22 should be through a switch. Following the self-heating of the adhesive layer 28 from the flow of electrical current therethrough between the pins 22, the assembly appears as in FIG. 7 with the adhesive layer 28 bonded into the surface of the fabric 20.

Figure 8:
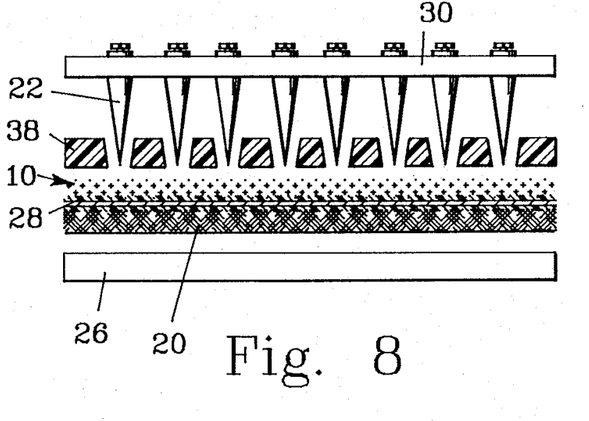
FIG. 8 shows the apparatus of FIG. 7 with the contact pins raised and the ejection plate lowered to eject the bonded touch fastener material from the contact pins.

The upper plate 30 and ejection/pressure plate 38 are then raised in combination and the ejection/pressure plate moved to the ends of the pins 22 by the driver mechanisms 32, 42 as depicted in FIG. 8. This ejects the bonded touch fastener material 10 and fabric 20 from the pins 22 and leaves space for them to be withdrawn from between the support plate 26 and the ejection/pressure plate 38.

While the apparatus of FIGS. 5-8 will work for batch operations such as spot fastening, and the like, in the manner of a stapling machine, for larger and more commercial operations there is a need for continuous feed attachment apparatus which operate in a manner such as sewing machines do with respect to sewing operations. Such apparatus in various embodiments according to the present invention will now be described. For simplicity and to avoid redundancy, only those portions of the apparatus relative to the specific problem of attaching my self-heating touch fastening material will be shown and described. The remaining portions of the apparatus are well within the capability of those skilled in the art to design without undue experimentation.

Figure 9:
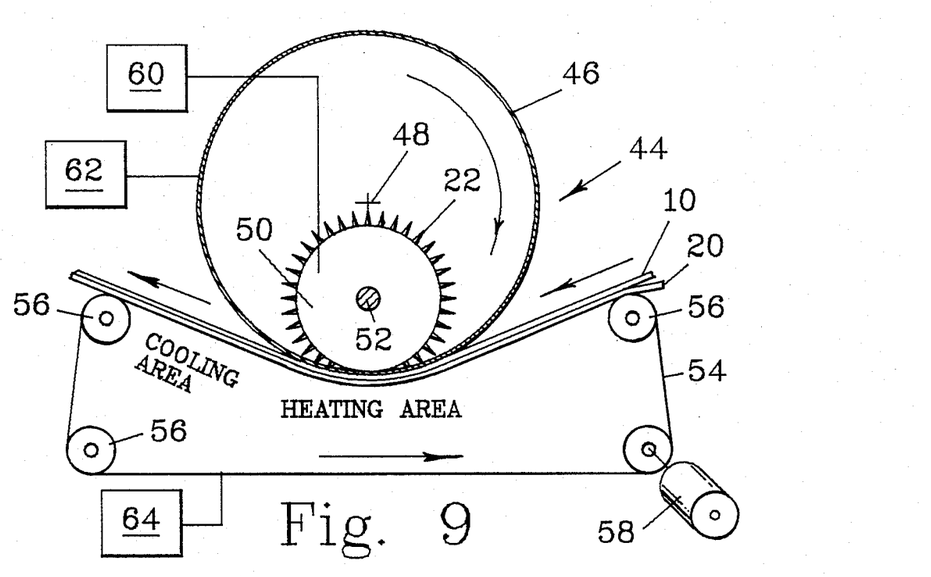
FIG. 9 is a simplified side view of a second embodiment of apparatus according to the present invention wherein a rotating pressure cylinder is employed along with the contact pins on a separate contact cylinder.

A continuous feed apparatus, generally indicated as 44, employing a pressure roller and belt feets is shown in FIG. 9. The pressure roller is in the form of a hollow cylinder 46 supported for rotation about its longitudinal axis 48. Disposed within the pressure cylinder 46 is a contact roller 50 having the contact pins 22 disposed about its outer periphery. The contact roller 50 is adopted for rotation about support shaft 52 which is parallel to the axis 48 of pressure cylinder 46 and pressure cylinder 46 has slots or holes (not shown) in the sidewalls thereof through which the pins 22 can project as the cylinder 46 and roller 50 rotate.

A pressure/feed band 54 is disposed over rollers 56 to be driven by motor 58 as indicated by the arrows. The band 54 is positioned to bear against the cylinder 46 where the pins 22 on contact roller 50 pass through its walls. An electrical source 60 is connected to the contact roller 50 to provide the electrical potential to the contact pins 22. Additionally, it is preferred that first temperature control means 62 be operably connected to maintain the temperature of the band 54 at an optimum working temperature for each application. It is also preferred that second temperature control means 64 be operably connected to maintain the temperature of the pressure cylinder 46 at an optimum working temperature for each application as well.

In operation to apply a strip of touch fastener material 10 to a strip of fabric 20, the two are fed between the pressure cylinder 46 and the band 54 and moved therebetween by the movement of the band 54. As the pins 22 emerge from the sidewalls of the pressure cylinder 46, they contact the self-heating adhesive and apply a high current therethrough in the same manner as described above. Thus, in the area labelled "HEATING AREA" in FIG. 9 the adhesive is caused to heat and bond to the fabric 20. The thus bonded materials 10, 20 are then moved into a "COOLING AREA" by the apparatus 44 as the pins 22 are continuously withdrawn therefrom and inserted into the area behind that which has just been heat bonded.

Figure 10:
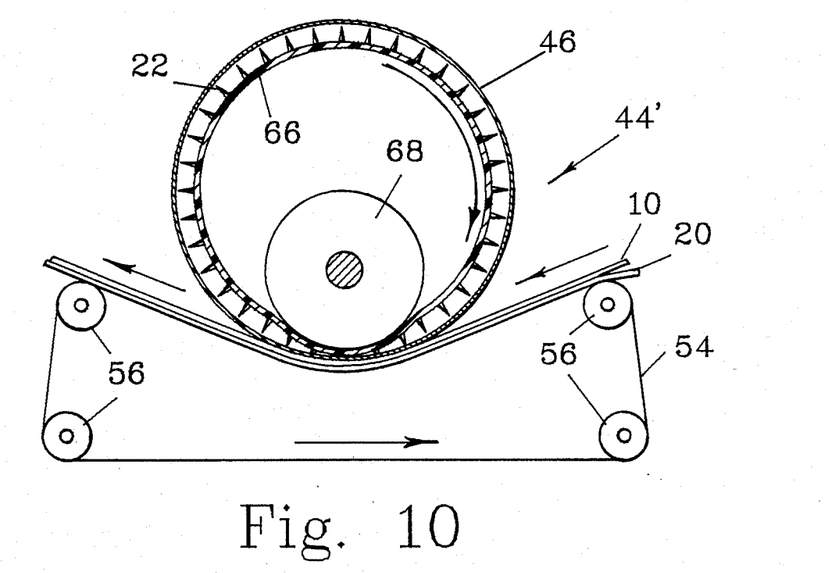
FIG. 10 is a simplified side view of a third embodiment of apparatus according to the present invention wherein a rotating pressure cylinder is employed along with contact pins inserted by eccentric action.

A similar and alternate embodiment, generally indicated as 44', to that of FIG. 9 is shown in FIG. 10. The apparatus of FIG. 10 is substantially identical to that of FIG. 9 except that the contact roller 50 has been replaced by an elastomeric cylinder 66 disposed within the pressure cylinder 46 and adapted to rotate in combination therewith. The pins 22 are carried by the cylinder 6 on the outer surface thereof and are disposed adjacent matching holes (not shown) in the sidewalls of the pressure cylinder 46 provided thereof. The elastomeric cylinder 66 passes over a deflection roller 68 which is positioned in the same manner as the contact roller 50 of the previous embodiment. As the pressure cylinder 46 and elastomeric cylinder 66 revolve, the deflection roller 68 urges the pins 22 out through the adjacent holes in the sidewalls of the pressure cylinder 46 to contact the materials passing between the pressure cylinder 46 and band 54 in the same manner as described above with respect to the apparatus 44 of FIG. 9.

Figure 11:
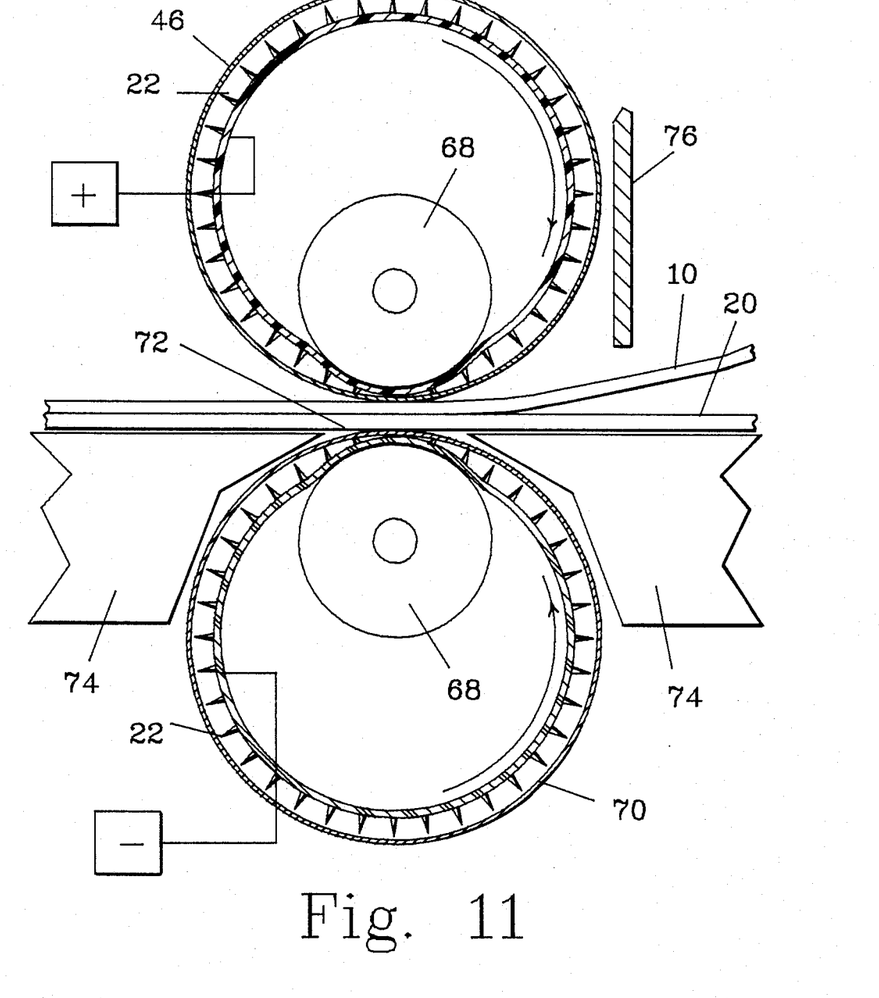
FIG. 11 is a simplified side view of a fourth embodiment of apparatus according to the present invention wherein a pair of opposed rotating pressure cylinders are employed along with opposed contact pins inserted by eccentric action.

A variation on the above theme is shown in the apparatus of FIG. 11 wherein the band 54 has been replaced by a second pressure cylinder 70 identical to the pressure cylinder 46 of FIG. 10 disposed in opposition thereto so as to form a pinching action therebetween. Like the band 54, the pressure cylinder is rotated by a motor (not shown). The pressure cylinder configuration of FIG. 9 (or a combination thereof) could, of course, be used. The electrical connections in this instance are easier since the pins 22 of one of the cylinders 46, 70 can be connected to the positive (+) source while those of the other can be connected to the negative (−) source. The cylinders 46, 70 are disposed on opposite sides of a slot 72 in a worktable 74 used to support the materials into and out of the bonding apparatus in the absence of the band 54 of the previous two embodiments. A guard 76 to prevent pinched fingers is preferred in this and all embodiments described herein.

Figure 12:
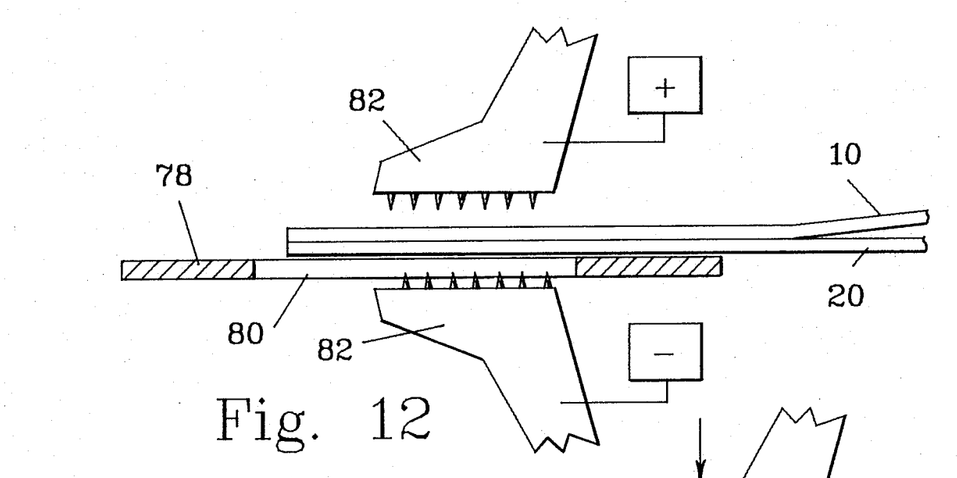
FIGS. 12–15 are simplified side views of a fifth embodiment of apparatus according to the present feet operate in the manner of the feed foot of a sewing machine.
Figure 13:
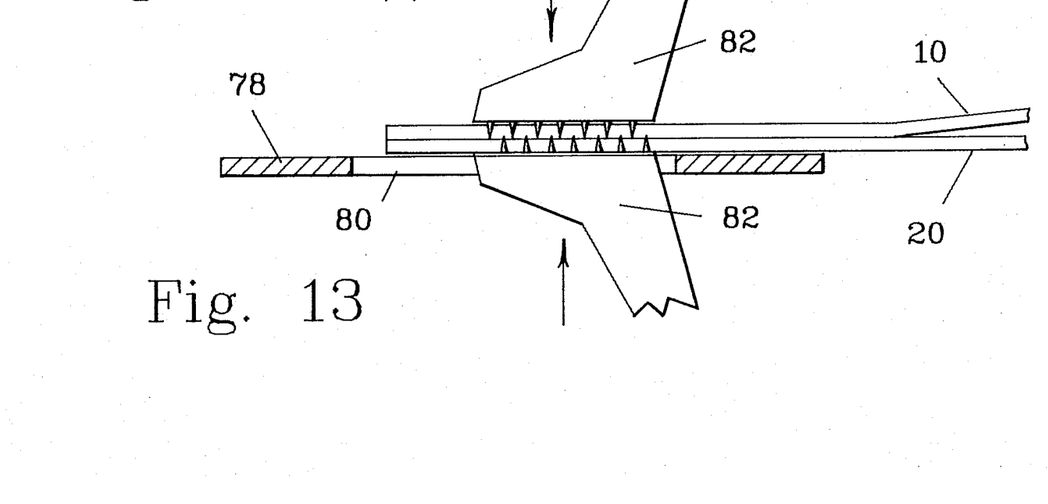
Figures 14, 15:
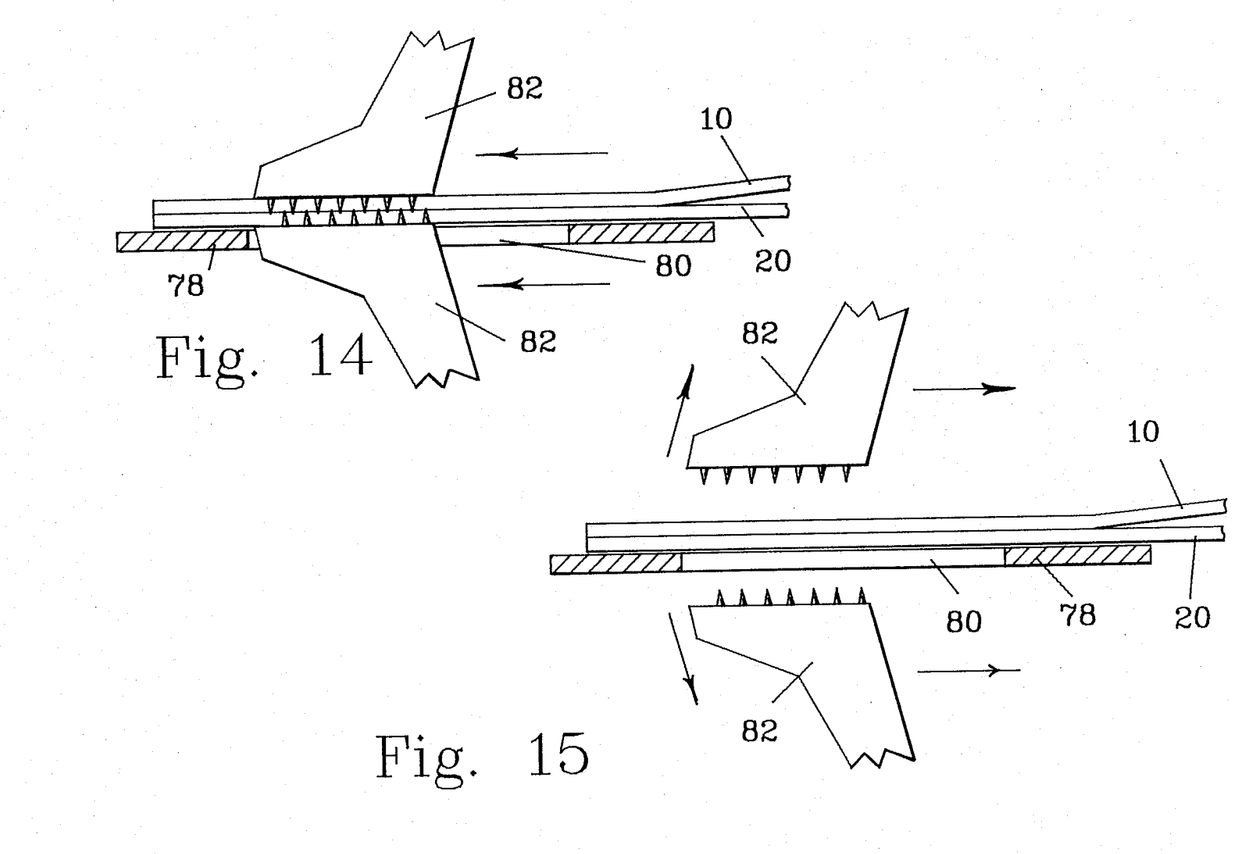

Yet another embodiment operating in the manner of a sewing machine is shown in simplified form in FIGS. 12–15. A worktable 78 having a slot 80 therein is provided for the support of the materials 10, 20 to be joined. The movement and the bonding are accomplished by a pair of opposed contact feet 82 having the contact pins 22 extending towards one another on the facing surfaces thereof. The contact feet 82 are not in electrical contact with one another and, therefore, electrical contact to the pins 22 can be in the simple manner of that used with the apparatus of FIG. 11; that is, for example, the upper foot 82 can be connected to positive (+) and the lower foot 82 connected to negative (−) as indicated. The feet 82 work in mirror image of one another and are operably connected to means (not shown) for moving them in the manner of the driving foot of a sewing machine. Such driving assemblies, again, are well known to those skilled in the art and are not shown in the interest of simplicity and to avoid redundancy. In their initial position as shown in FIG. 12, the feet 82 are separated and forward. As depicted by FIG. 13, the feet 82 then move towards one another to grip the materials 10, 20 therebetween and contact the adhesive layer. The feet 82 then move to the position of FIG. 14 (drawing the material 10, 20 with them) during which time the adhesive is heated by the current flowing therethrough so as to bond that area of the materials 10, 20 together in the manner of a sewing machine taking a stitch. The feet 82 then move apart and back to the position of FIG. 12 as indicated by the arrows of FIG. 15. The process then repeats for another "stitch."

Wherefore, having thus described my invention, I claim:

1. Apparatus for attaching touch fastener material to a surface, said apparatus comprising:
   (a) touch fastener material having
      (1) a backing material with front and rear surfaces and having one portion of a touch fastening system on the front surface thereof,
      (2) a layer of thermoplastic/thermosetting adhesive bonded to the rear surface, and
      (3) an electrically conductive/resistive material incorporated into the layer of adhesive capable of producing sufficient heat in the adhesive when a low voltage and high current electrical source is applied therethrough to cause the adhesive to adhere to the surface of an article with which it is in contact;
   (b) support means for supporting the article with the surface thereof exposed and the touch fastener material disposed thereon;
   (c) compression means for releasably bearing against the front surface of the touch fastener material to hold it and its adhesive against the surface of the article;
   (d) a pluraltiy of contact means for releasably making direct electrical contact with the electrically conductive/resistive material in the adhesive when said compression means is bearing against the front surface of the touch fastener material; and
   (e) electrical means for applying low voltage electrical current to flow through the electrically conductive/resistive material in the adhesive between respective ones of said contacts to heat the adhesive to its point of melting and adhesion.

2. Apparatus suitable for attaching touch fastener material having a backing material with front and rear surfaces and having one portion of a touch fastening system on the front surface thereof, and a layer of thermoplastic/thermosetting adhesive bonded to the rear surface, and, an electrically conductive/resistive material incorporated into the layer of adhesive capable of producing sufficient heat in the adhesive when a low voltage adn high current electrical source is applied therethrough to cause the adhesive to adhere to the surface of an article with which it is in contact, said apparatus comprising:
   (a) support means for supporting the article with the surface thereof exposed and the touch fastener material disposed thereon;
   (b) compression means for releasably bearing against the front surface of the touch fastener material to hold it and its adhesive against the surface of the article;
   (c) a plurality of contact means for releasably making electrical contact with the electrically conductive/resistive material in the adhesive when said compression means is bearing against the front surface of the touch fastener material;
   (d) electrical means for applying low voltage electrical current to follow through the electrically conductive/resistive material in the adhesive between respective ones of said contacts to heat the adhesive to its point of melting and adhesion; wherein
   (e) said compression means is a hollow cylindrical roller mounted for rotation about a longitudinal axis;
   (f) said support means is a moving band disposed close adjacent the surface of said roller at one point and moving in a plane parallel to said longitudinal axis at said one point, said band being positioned and adapted to have the article and touch fastener material disposed thereon and to carry them between said band and said roller at said one point to be compressed therebetween as said roller rolls along said band;

(g) said plurality of contact means comprises a plurality of contact pins disposed within said roller; and additionally comprising, (h) a plurality of holes circumferally disposed in sidewalls of said roller for having said contact pins pass therethrough; and, (i) means within said roller for urging said contact pins through respective ones of said holes to contact the adhesive at said one point and for retracting said contact pins into said roller when not adjacent said one point.

3. The apparatus of claim 2 wherein:
said contact pins are mounted on the outer surface of a contact roller rotating on a longitudinal axis parallel to and offset from said longitudinal axis of said hollow cylindrical roller.

4. The apparatus of claim 2 wherein:
(a) said contact pins are mounted on the outer surface of an elastomeric cylinder rotating in combination with said hollow cylindrical roller on a common longitudinal axis therewith; and additionally comprising, (b) deflection roller means rotating on a longitudinal axis parallel to and offset from said longitudinal axis of said hollow cylindrical roller, said deflection roller means being disposed adjacent said one point for having said elastomeric cylinder pass thereover and for deflecting said elastomeric cylinder and urging said contact pins through said holes to contact the adhesive adjacent said one point.

5. Apparatus suitable for attaching touch fastener material having a backing material with front and rear surfaces and having one portion of a touch fastening system on the front surface thereof, and a layer of thermoplastic/thermosetting adhesive bonded to the rear surface, and, an electrically conductive/resistive material incorporated into the layer of adhesive capable of producing sufficient heat in the adhesive when a low voltage and high current electrical source is applied therethorugh to cause the adhesive to adhere to the surface of an article with which it is in contact, said apparatus comprising:

(a) support means for supporting the article with the surface thereof exposed and the touch fastener material disposed thereon;

(b) compression means for releasably bearing against the front surface of the touch fastener material to hold it and its adhesive against the surface of the article;

(c) a plurality of contact means for releasably making electrical contact with the electrically conductive/resistive material in the adhesive when said compression means is bearing against the front surface of the touch fastener material;

(d) electrical means for applying low voltage electrical current to flow through the electrically conductive/resistive material in the adhesive between respective ones of said contacts to heat the adhesive to its point of melting and adhesion; wherein (e) said compression means is a first hollow cylindrical roller mounted for rotation about a longitudinal axis;

(f) said support means is a second hollow cylindrical roller mounted for driven rotation about a longitudinal axis parallel to said longitudinal axis of said first roller and disposed close adjacent said first roller at one point, said rollers being positioned and adapted to grip and pull the article and touch fastener material therebetween at said one point to be compressed between said rollers;

(g) said plurality of contact means comprises a plurality of contact pins disposed within said rollers; and additionally comprising, (h) a plurality of holes circumferally disposed in sidewalls of said rollers for having said contact pins pass therethrough; and, (i) means within said rollers for urging said contact pins through respective ones of said holes to contact the adhesive at said one point and for retracting said contact pins into said rollers when not adjacent said one point.

6. The apparatus of claim 5 wherein:
(a) said pins in first roller are all connected to a positive (+) electrical potential; and,
(b) said pins in second roller are all connected to a negative (−) electrical potential.

7. The apparatus of claim 5 wherein:
said contact pins are mounted on the outer surface of contact rollers rotating on longitudinal axes parallel to and offset from said longitudinal axes of respective ones of said first and second hollow cylindrical rollers.

8. The apparatus of claim 5 wherein:
(a) said contact pins are mounted on the outer surface of elastomeric cylinders rotating in combination with respective ones of said hollow cylindrical rollers on common longitudinal axes therewith; and additionally comprising, (b) a pair of deflection roller means rotating on longitudinal axes parallel to and offset from respective ones of said longitudinal axes of said hollow cylindrical rollers, said deflection roller means being disposed adjacent said one point for having said elastomeric cylinders pass thereover and for deflecting said elastomeric cylinders and urging said contact pins through said holes to contact the adhesive adjacent said one point.

9. The apparatus of claim 5 and additionally comprising:
planar worktable means disposed in a plane parallel to said longitudinal axes of said first and second rollers for supporting the touch fastener material and the article in combination into and out of said one point, said first roller being disposed on one side of said worktable means and said second roller being disposed on the other side of said worktable means, and said worktable means having a slot therethrough adjacent said one point through which said first and second rollers can communicate with one another.

10. The apparatus of claim 1 and additionally comprising:
(a) planar worktable means for supporting the touch fastener material and the article in combination on a top surface thereof, said worktable means having a longitudinal slot therethrough communicating between said top surface and a bottom surface thereof; wherein,
(b) said compression means is a first foot disposed above said slot;

(c) said support means is a second foot disposed below said slot, said feet being mirror images of one another and adapted to move in a driven pattern wherein they start from a first position at one end of said slot at positions opposed and separated from one another, and then move towards one another to grip the touch fastener material and article in combination therebetween, then move along the length of said slot, then separate from one another to release the touch fastener material and article from therebetween, and then return to said first position; and wherein additionally, (d) said contact means comprise a plurality of contact pins disposed on facing surfaces of respective ones of said feet.

11. Apparatus suitable for attaching touch fastener material having a backing material with front and rear surfaces and having one poriton of a touch fastening system on the front surface thereof, and a layer of thermoplastic/thermosetting adhesive bonded to the rear surface, and, an electrically conductive/resistive material incorporated into the layer of adhesive capable of producing sufficient heat in the adhesive when a low voltage and high current electrical source is applied therethrough to cause the adhesive to adhere to the surface of an article with which it is in contact, said apparatus comprising:

(a) support means for supporting the article with the surface thereof exposed and the touch fastener material disposed thereon;

(b) compression means for releasably bearing agnaist the front surface of the touch fastener material to hold it and its adhesive against the surface of the article;

(c) a plurality of contact means for releasably making electrical contact with the electrically conductive/resistive material in the adhesive when said compression means is bearing against the front surface of the touch fastener material;

(d) electrical means for applying low voltage electrical current to flow through the electrically conductive/resistive material in the adhesive between respective ones of said contacts to heat the adhesive to its point of melting and adhesion;

(e) planar worktable means for supporting the touch fastener material and the article in combination on a top surface thereof, said worktable means having a longitudinal slot therethrough communicating between said top surface and a bottom surface thereof; wherein, (f) said compression means is a first foot disposed above said slot;

(g) said support means is a second foot disposed below said slot, said feet being mirror images of one another and adapted to move in a driven pattern wherein they start from a first postiion at one end of said slot at positions opposed and separated form one another, and then move towards one another to grip the touch fastener material and article in combination therebetween, then move along the length of said slot, then separate from one another to release the touch fastener material and article from therebetween, and then return to said first position; and wherein additionally, (h) said contact means comprise a plurality of contact pins disposed on facing surfaces of respective ones of said feet;

(i) said pins on said first foot are all connected to a postiive (+) electrical potential; and (j) said pins on said second foot are all connected to a negative (−) electrical potential.

12. Apparatus for attaching touch fastener material having a backing material with front and rear surfaces and having one portion of a touch fastening system on the front surface thereof, a layer of thermoplastic/thermosetting adhesive bonded to the rear surface, and, an electrically conductive/resistive material incorporated into the layer of adhesive capable of producing sufficient heat in the adhesive when a low voltage and high current electrical source is applied therethrough to cause the adhesive to adhere to the surface of an article with which it is in contact, said apparatus comprising:

(a) support means for supporting the article with the surface thereof exposed and the touch fastener material disposed thereon, said support means comprising a movable band;

(b) a hollow compression cylinder mounted for driven rotation for releasably bearing against the front surface of the touch fastener material as it rotates to hold it and its adhesive against the surface of the article, said hollow compression cylinder having a plurality of equally spaced holes through the sidewalls thereof;

(c) a plurality of contact pins carried within said compression cylinder for passing through said holes in said compression cylinder in non-electrical contact therewith and with one another and for making electrical contact with the electrcially conductive/resistive material in the adhesive at a point of contact when said compression means is bearing against the front surface of the touch fastener material and rolling along said band;

(d) means for moving said contact pins through said holes between an extended position and a retracted position adjacent said point of contact; and, (e) electrical means for alternately applying positive (+) and negative (−) low voltage electricity to adjacent respective ones of said pins so as to cause high electrical current to flow through the electrically conductive/resistive material in the adhesive between respective ones of said pins to heat the adhesive to its point of melting and adhesion.

13. The apparatus of claim 12 wherein:
said contact pins are mounted on the outer surface of a contact roller rotating on a longitudinal axis parallel to and offset from said longitudinal axis of said hollow cylindrical roller.

14. The apparatus of claim 12 wherein:
(a) said contact pins are mounted on the outer surface of an elastomeric cylinder rotating in combination with said hollow cylindrical roller on a common longitudinal axis therewith; and additionally comprising, (b) deflection roller means rotating on a longitudinal axis parallel to and offset from said longitudinal axis of said hollow cylindrical roller adjacent said point of contact, said deflection roller means being disposed for having said elastomeric cylinder pass thereover and for deflecting said elastomeric cylinder and urging said contact pins through said holes to contact the adhesive.

15. Apparatus for attaching touch fastener material having a backing material with front and rear surfaces and having one portion of a touch fastening system on the front surface thereof, and a layer of thermoplastic/- thermosetting adhesive bonded to the rear surface, and, an electrically conductive/resistive material incorporated into the layer of adhesive capable of producing sufficient heat in the adhesive when a low voltage and high current electrical source is applied therethrough to cause the adhesive to adhere to the surface of an article with which it is in contact, said apparatus comprising:

(a) support means for supporting the article with the surface thereof exposed and the touch fastener material disposed thereon, said support means comprising a first hollow cylinder mounted for rotation;

(b) a second hollow cylinder mounted close adjacent said first cylinder for driven rotation about an axis of rotation parallel to the axis of rotation of said first cylinder, said second cylinder being a compression roller for releasably bearing against the front surface of the touch fastener material as it rotates to hold it and its adhesive against the surface of the article and gripped between said first and second cylinders, said first and second hollow cylinders each having a plurality of equally spaced holes through the sidewalls thereof;

(c) a plurality of first contact pins carried within said first cylinder for passing through said holes in said first cylinder in non-electrical contact therewith and with one another and for making electrical contact with the electrically conductive/resistive material in the adhesive at a point of contact;

(d) a plurality of second contact pins carried within said second cylinder for passing through said holes in said second cylinder in non-electrical contact therewith and with one another and for making electrical contact with the electrically conductive/resistive material in the adhesive at said point of contact;

(e) means within respective ones of said first and second cylinders for moving said contact pins through said holes between an extended position and a retracted position adjacent said point of contact; and, (f) electrical means for applying positive (+) and negative (−) low voltage electricity respectively to said first and second contact pins so as to cause high electrical current to flow through the electrically conductive/resistive material in the adhesive between said first and second contact pins to heat the adhesive to its point of melting and adhesion.

16. The apparatus of claim 15 wherein:
said contact pins are mounted on the outer surface of contact rollers rotating on longitudinal axes parallel to and offset from the longitudinal axes of respective ones of said first and second hollow cylinders.

17. The apparatus of claim 15 wherein:

(a) said contact pins are mounted on the outer surface of elastomeric cylinders rotating in combination with respective ones of said first and second hollow cylinders on common longitudinal axes therewith; and additionally comprising, (b) a pair of deflection roller means rotating on longitudinal axes parallel to and offset from respective ones of said longitudinal axes of said first and second hollow cylinders, said deflection roller means being disposed adjacent said point of contact for having said elastomeric cylinders pass thereover and for deflecting said elastomeric cylinders and urging said contact pins through said holes to contact the adhesive adjacent said point of contact.

18. The apparatus of claim 15 and additionally comprising:
planar worktable means disposed in a plane parallel to said longitudinal axes of said first and second cylinders for supporting the touch fastener material and the article in combination into and out of said point of contact, said first cylinder being disposed on one side of said worktable means and said second cylinder being disposed on the other side of said worktable means, said worktable means having a slot therethrough adjacent said point of contact through which said first and second cylinders can communicate with one another.

19. Apparatus for attaching touch fastener material to a surface, said apparatus comprising:

(a) touch fastener material having
(1) a backing material with front and rear surfaces and having one portion of a touch fastening system on the front surface thereof,
(2) a layer of thermoplastic/thermosetting adhesive bonded to the rear surface, and
(3) an electrically conductive/resistive material incorporated into the layer of adhesive capable of producing sufficient heat in the adhesive when a low voltage and high current electrical source is applied therethrough to cause the adhesive to adhere to the surface of an article with which it is in contact (b) planar worktable means for supporting the touch fastener material and the article in combination on the top surface thereof, said work table means having a longitudinal slot therethrough communicating between said top surface and a bottom surface thereof;

(c) compression means for releasably bearing against the front surface of the touch fastener material to hold it and its adhesive against the surface of the article, said compression means being a first foot disposed above said slot;

(d) support means for supporting the article with the surface theroef exposed and the touch fastener material disposed thereon, said support means being a seocnd foot disposed below said slot, said feet being mirror image of one another and adapted to move in a driven pattern wherein they start from a first position at one end of said slot at positions opposed and separated from one another, then moved towards one another to grip the touch fastener material and article in combination therebetween, then move along the length of said slot, then separate from one another to release the touch fastener material and article from therebetween, and then return to said first position;

(e) a plurality of contact means for releasably making direct electrical contact with the electrically conductive/resistive material in the adhesive when said compression means is bearing against the front surface of the touch fastener material, said contact means being a plurality of first and second contact pins disposed on facing surfaces of respective ones of said feet; and (f) electrical means for applying low voltage electrical current to flow through the electrically conductive/resistive material in the adhesive to heat the adhesive to its point of melting and adhesion, said electrical means comprising means for connecting said first contact pins on said first foot to a positive (+) electrical potential and for connecting said second contact pins on said second foot to a negative (−) electrical potential.

* * * * *

UNITED STATES PATENT AND TRADEMARK OFFICE
CERTIFICATE OF CORRECTION

PATENT NO.   :   4,822,443
DATED        :   April 18, 1989
INVENTOR(S)  :   John M. DUBOWIK It is certified that error appears in the above—identified patent and that said Letters Patent is hereby corrected as shown below:

Claim 2, column 8, line 41 "adn" should be spelled "and".
Claim 2, column 8, line 58 replace the word "follow" with the word --flow--.

Claim 11, column 11, line 18 "poriton" should be spelled "portion".
Claim 11, column 11, line 57 "postiion" should be spelled "position".
Claim 11, column 12, line 2 "postiive" should be spelled "positive".
Claim 11, column 11, line 59 replace the word "form" with the word --from--.

Claim 19, column 14, line 27 a --;-- should follow the word "contact"
Claim 19, column 14, line 42 replace the word "image" with the word --images--

Signed and Sealed this

Twenty-third Day of January, 1990

*Attest:*

JEFFREY M. SAMUELS

*Attesting Officer*    *Acting Commissioner of Patents and Trademarks*